(12) United States Patent
Khen et al.

(10) Patent No.: US 9,830,599 B1
(45) Date of Patent: Nov. 28, 2017

(54) HUMAN INTERACTION DETECTION

(75) Inventors: Amnon Khen, Tel Aviv (IL); Roy Hodgman, Wenham, MA (US); Alon Kaufman, Bnei-Dror (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1143 days.

(21) Appl. No.: 12/974,768

(22) Filed: Dec. 21, 2010

(51) Int. Cl.
*G06Q 20/00* (2012.01)
*G06Q 20/40* (2012.01)
*G06F 21/31* (2013.01)
*G06F 21/30* (2013.01)

(52) U.S. Cl.
CPC .......... *G06Q 20/40* (2013.01); *G06F 21/30* (2013.01); *G06F 21/316* (2013.01)

(58) Field of Classification Search
CPC .................. G06Q 20/40; G06F 21/316
See application file for complete search history.

(56) References Cited

U.S. PATENT DOCUMENTS

| 5,533,103 | A  | * | 7/1996  | Peavey .................. H04M 3/51 379/265.07 |
| 5,758,062 | A  | * | 5/1998  | McMahon ........ G06F 11/3688 714/33 |
| 7,523,191 | B1 | * | 4/2009  | Thomas ............. G06F 11/3438 709/202 |
| 7,552,467 | B2 | * | 6/2009  | Lindsay ................. G06F 21/31 713/165 |
| 7,565,330 | B2 | * | 7/2009  | Steeves et al. ................ 705/75 |
| 7,680,891 | B1 |   | 3/2010  | Pongsajapan |
| 7,891,005 | B1 |   | 2/2011  | Baluja et al. |
| 8,683,549 | B2 | * | 3/2014  | Baker .................... G06F 21/31 713/193 |
| 8,701,183 | B2 | * | 4/2014  | Mualem ................ G06F 21/36 705/44 |
| 8,918,876 | B2 | * | 12/2014 | Larsson ............... G06F 21/554 726/23 |
| 2003/0131016 | A1 | * | 7/2003  | Tanny ............... G06F 17/30522 |
| 2004/0117804 | A1 | * | 6/2004  | Scahill .................... G06F 9/542 719/320 |
| 2004/0225877 | A1 | * | 11/2004 | Huang .................. G06F 21/552 713/100 |
| 2005/0008148 | A1 | * | 1/2005  | Jacobson ................ G06F 3/038 380/26 |
| 2005/0060719 | A1 | * | 3/2005  | Gray .................... G06F 9/4443 719/318 |
| 2005/0254775 | A1 | * | 11/2005 | Hamilton .............. G06F 9/4443 386/210 |
| 2006/0287963 | A1 | * | 12/2006 | Steeves et al. .................. 705/64 |
| 2007/0005500 | A1 | * | 1/2007  | Steeves et al. .................. 705/51 |
| 2008/0127302 | A1 | * | 5/2008  | Qvarfordt .............. G06F 21/36 726/2 |
| 2008/0256517 | A1 | * | 10/2008 | Atkin .................. G06F 11/3688 717/124 |

(Continued)

*Primary Examiner* — Steven Kim
(74) *Attorney, Agent, or Firm* — BainwoodHuang

(57) ABSTRACT

An improved technique of processing an electronic transaction is disclosed. In the improved technique, a validation operation is performed on a set of standard user input and a set of peripheral device data received by a server connected to a client computer, the validation operation verifying a link between the set of standard user input and the set of peripheral device data. Based on results of the validation operation, an authorization code is assigned to the electronic transaction.

14 Claims, 8 Drawing Sheets

(56) References Cited

U.S. PATENT DOCUMENTS

2009/0292924 A1* 11/2009 Johnson et al. .............. 713/176
2010/0287228 A1* 11/2010 Hauser .................... G06F 21/36
                                                              709/203
2010/0287229 A1* 11/2010 Hauser .................. G06F 21/316
                                                              709/203

* cited by examiner

HUMAN INTERACTION DETECTION

BACKGROUND

The use of electronic transactions over public networks such as the Internet has greatly increased over the past decade. Each electronic transaction taking place over the Internet runs the risk of personally identifiable information (PII) being exposed to unwanted third parties.

Conventional systems for carrying out electronic transactions over the Internet use software embedded within an Internet browser and run on a script written in a scripting language for which the browser has an interpreter. The scripting language interpreter in modern browsers is typically a Javascript interpreter.

An example of software for conducting electronic transactions which has a user interface running in a browser is a banking application in which a user on a computer wishes to transfer funds from one account to another within a banking institution. In such an application, a user inputs values relating to the electronic transaction into text boxes within the browser. The values typed into the text boxes are sent to the banking institution upon a command from the user, e.g., clicking a "SEND" button in the browser. The banking institution receives the values and processes them.

SUMMARY

Systems engaging in electronic transactions over the Internet are frequently subjected to attacks from rogue processes which attempt to mimic a user of a banking application on a computer through a browser. Such rogue processes are capable of facilitating fraud at the expense of the user in several ways. In one such way, a rogue process can alter values a user has entered into the banking application. For example, if a user wishes that a transfer should be made to account number 123456 and submits a form containing the account number, the malware can intercept the submission, change 123456 to a different number of its choosing, and send the submission to the banking institution. [This is known as a "man in the browser" attack.] The user is unaware that the incorrect account number has been used. In another way a rogue process can facilitate fraud, the rogue process can input values independently of the user onto a bank's website. For example, when a user logs into a bank website, the rogue process can make HTTP requests on behalf of that user. Behind the scenes, without rendering any HTML that is visible to the user, the rogue process can request, say, a page on the banking website which enables transfers between accounts. The rogue process can then fill the page out with an alternative account as a destination for transferred funds and send the information back to the bank without any content being made visible to the user.

Such rogue processes can originate from a malware script which generates HTTP requests and text or HTML through the browser. These malware scripts are effective because a banking institution's server which receives the requests and text is only aware of the data sent to it and not the means by which the data was generated thus it cannot differentiate between an action done manually by a human and one done automatically by a script. In this respect, there is a clear difference between a user entering data on an input peripheral device and a rogue process entering data via a malware script.

Such differences are exploited in conventional systems such as CAPTCHA ("Completely Automated Public Turing test to tell Computers and Humans Apart"). A CAPTCHA, for example, relies on the user to visually interpret a graphic containing a passage of text warped in a way that is too difficult for computerized algorithms to interpret. The user is prompted to enter the text which the graphic represents. A correct response allows data input by the user to be accepted by the banking institution; an incorrect response may result in considering the respondent as non-human. The idea is that a malware script will not be able to answer a CAPTCHA correctly and, by posing a CAPTCHA with each data submission, the data sent to the banking institution is guaranteed to be sent by a user rather than a malware script.

Unfortunately, the CAPTCHA process requires active participation from the user outside of the user's purpose of inputting data needed to process a transaction with the banking institution. If a user needs to process many transactions, many CAPTCHAs can be required and slow down a user to a point of frustration.

In contrast to the above-described conventional transaction infrastructures in which electronic transactions are susceptible to malicious tampering by an attacker (e.g., by changing parameters of the transaction without knowledge of an authorized user), an improved technique receives, from a web session, standard user input (e.g., routine form data) as well as secondary user input that describes the way the standard user input was produced (e.g., the keys that where pressed, the location of the mouse, the buttons that were clicked and the time of these events) and compares the secondary user input to the standard user input. Such operation enables the receiver of both inputs to verify the authenticity of the standard user input, i.e., to confirm that the secondary user input is actually from the user rather than an automated script that is often malware. In particular, if the receiver determines that the secondary user input is not consistent with standard user input, the receiver can take remedial steps in order to thwart the efforts of the attacker.

Such a technique may be particularly useful for certain types of web-based operations such as electronic banking transactions. For example, if data is sent from a banking website with a user's PII and information to transfer money from one account into another, the server will check its cache for the secondary user input. If the secondary user input is not present in the cache, the transaction will not be approved. On the other hand, if secondary user input is present in the cache of the server, then a validation operation is performed on the secondary user input against the sent data. In this case, the transaction is approved when the validation operation results in a match as deemed by the server. The transaction is rejected when the results of the validation operation imply a mismatch between the secondary user input and the sent data; that is, a user providing the secondary user input could not have produced the sent data.

In some arrangements, the secondary user input can include a set of keystrokes and a corresponding timestamp for each keystroke. The validation operation can include verifying that each keystroke executed at the time of execution denoted by the corresponding timestamp produces sent data relevant to the electronic transaction. In another arrangement, the secondary user input from the input peripheral device includes a set of mouse clicks, a corresponding timestamp for each mouse click and the UI element where the mouse click occurred. In this case, the validation operation can include verifying that the set of mouse clicks, each mouse click executed at the time of execution denoted by the corresponding timestamp, in addition to the set of keystrokes, produces sent data relevant to the electronic transaction. In a further embodiment, the secondary user input includes a form focus event which denotes an identification of an active form component within the active window on the client computer. That is, the validation operation can take into account which form component in the active window is active at particular time intervals in order to better recreate the data typed into the browser by the user.

It should be understood that there may not be a unique, one-to-one map between the secondary user input and the sent data. For example, a user may have typed a digit incorrectly in the process of entering an account number into the banking website. In this case, the user may have had to type in at least one backspace as well as the correct digits. Alternatively, the user could correct the account number by dragging a mouse over the number or a part of the number and typing the correct digits.

It is also possible for a browser to employ an Autofill feature which automatically fills in commonly typed strings such as names and account numbers. In this case, the verification operation makes a decision based upon incomplete information, unless the verification operation has access to the same information on which the Autofill feature relies. With incomplete information, the results of the verification operation can take the form of assigning an authorization code to the electronic transaction from which the banking institution may not only accept or reject the transaction, but also approve the transaction with a flag, or conditionally approve the transaction pending further information received from the client computer. For example, a transaction approved with a flag can denote that the transaction is to be approved but is also to be placed into a database from which closer tracking of the user's account can take place. Further, in a conditionally approved transaction, the server can send a message back to the user asking for additional PII or a challenge question to be answered correctly before approval is given to the transaction.

In some arrangements, the server which performs the validation operation is a proxy server connected to the banking institution server and the client computers. In this case, the proxy server can generate authorization codes from the results of the validation operations and send the authorization codes to the banking institutional server. An advantage of having a proxy server run the validation operation rather than the banking institutional server is that the proxy server can dedicate its processing power to running validation operations from many client computers in real time. In some further embodiments, the validation operation runs from a set of compiled libraries rather than interpreted scripts within a browser on the proxy server because the proxy server processes large amounts of client data.

It should be understood that the secondary user input from the input peripheral device can either be streamed to the server as it is generated or collected and sent with the data from the browser. In the former case, the secondary user input sent in real time is collected in a cache in the server where it is held until the corresponding sent data is received.

One embodiment of the improved technique is directed to a computer-implemented method of processing an electronic transaction. The method includes receiving, from a client computer connected to the server over a network, a set of standard user input and a set of peripheral device data, the client computer including an input peripheral device, the set of standard user input including data relevant to the electronic transaction, each peripheral device datum in the set of peripheral device data including a representation of a user action executed by a user on the input peripheral device in the course of generating the set of transaction data. The method also includes performing a validation operation on the set of standard user input and the set of peripheral device data, the validation operation verifying a link between the set of standard user input and the set of peripheral device data. The method further includes assigning an authorization code to the electronic transaction based on the validation operation.

Additionally, some embodiments of the improved technique are directed to a system for processing an electronic transaction, the system including a server. The server includes a network interface coupled to a network, a memory and a processor coupled to the memory, the processor configured to carry the method of processing an electronic transaction.

Furthermore, some embodiments of the improved technique are directed to a computer program product having a non-transitory computer readable storage medium which stores code including a set of server instructions to carry the method of processing an electronic transaction.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique receives, from a web session, standard user input (e.g., routine form data) as well as secondary user input (e.g., mouse movement data in response to operation of the user's electronic mouse) and compares the secondary user input to the standard user input. Such operation enables the receiver of both inputs to verify the authenticity of the standard user input, i.e., to confirm that the secondary user input is actually from the user rather than malicious input from an attacker. In particular, if the receiver determines that the secondary user input is not consistent with standard user input, the receiver can take remedial steps in order to thwart the efforts of the attacker.

According to the improved technique, the verification operation is performed on both the standard user input sent over the Internet by the client computer and the secondary user input. A banking institution's approval of an electronic transaction can depend from a result of the verification operation. In this way, if a rouge process on the client computer attempts to send standard user input to the banking institution using an automated malware script, the transaction will be rejected because no secondary user input will not match the standard user input.

Figure 1:
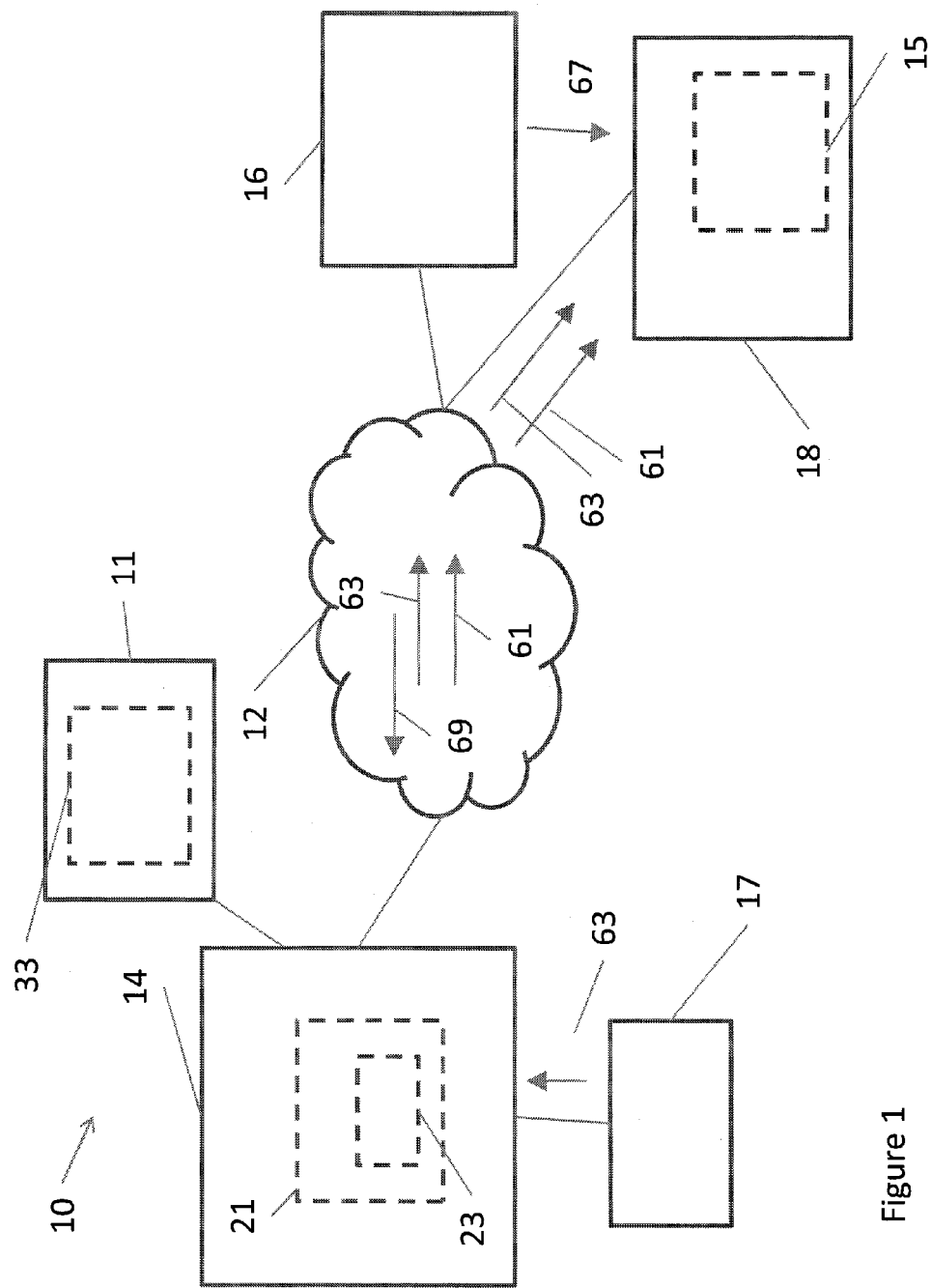
FIG. 1 is a block diagram of an electronic environment which is constructed and arranged to process an electronic transaction.

FIG. 1 shows an electronic environment 10 which is suitable for use by the improved technique. Electronic environment 10 includes communications medium 12, client computer 14 and institutional server 18. In some arrangements, electronic environment 10 also includes a proxy server 16.

Communication medium 12 provides connections between client computer 14, proxy server 16 and institutional server 18. Communication medium 12 includes a public network, for example, the Internet.

Client computer 14 includes an input peripheral device 17 and output device 11, e.g. a monitor 11. Client computer 14 runs an Internet browser 21 capable of rendering instructions written in, e.g., HTML, XML, etc. into a web page rendered by browser 21 in a window 33 on monitor 11. Further, the Internet browser includes an interpreter 23 configured to interpret Javascript code into a set of instructions which make up an application within the web page. The Javascript code is embedded in a plaintext file called a script and, upon interpretation by the interpreter, is used to form the basis of applications which run within the Internet browser. For example, Javascript code can produce, through the interpreter, the user interface to a banking application accessed by the user through the browser. The banking application user interface is configured to send electronic standard user input from client computer 14 to a banking institution.

A user on client computer 14 inputs, via input peripheral device 17, standard user input 61 into a user interface to an application within a web page rendered by browser 21 and represented on monitor 11 by a window 33. Input peripheral device 17 can include a keyboard on which the user types strings via keyboard strokes into the application, a mouse through which the user can point a cursor and provide mouse clicks, and a microphone through which, and in tandem with voice-recognition software, voice signals are converted to textual input.

Client computer 14 can record keyboard strokes, mouse clicks and mouse coordinate data and voice signals as various forms of secondary user input 63. For example, mouse coordinate data can include absolute coordinates or relative coordinates with respect to an origin on a monitor.

The secondary user input is sent separately from the standard user input over communication medium 12. For example, secondary user input 63 can be streamed in real time over communication medium 12. In another example, the secondary user input can be stored in a local file or memory associated with browser 21 on client computer 14 and then sent when the standard user input is sent.

It should be understood that secondary user input 63 further includes a timestamp corresponding to each event (i.e., keystroke, mouse click, etc.).

Institutional server 18 processes electronic transactions from web pages submitted by a user at client computer 14. Electronic transactions are nominally defined by the content in standard user input 61. Institutional server 18 is connected to client computer 14 through communications medium 12 and receives standard user input 61.

During operation, institutional server 18 receives standard user input 61 and secondary user input 63. Once institutional server 18 receives standard user input 61 and secondary user input 63, institutional server 18 runs a validation procedure on standard user input 61 and secondary user input 63. The validation procedure is configured, for example, to convert secondary user input 63 into string data of the same form as that supplied in the standard user input 61. Once institutional server 18 runs the validation procedure on the standard user input 61 and secondary user input 63, institutional server 18 assigns an authorization code to the transaction which is based on the standard user input 61, based on results from the validation procedure.

In some arrangements, proxy server 16, which is also connected to client computer 14 through communications medium 12, receives standard user input 61 and secondary user input 63 and runs the validation procedure. One reason that it is advantageous to use proxy server 16 rather than institutional server 18 for running the validation procedure is because institutional server 18 already processes electronic transactions and further processing required by running the validation procedure may be an excessive burden.

In the following description, it will be assumed that the electronic transaction will be a banking transaction and the institution of interest is a banking institution. Other arrangements are possible, e.g., medical transactions, government transactions. Further, it will also be assumed that the server receiving standard user input 61 and secondary user input 63 and running the validation procedure will be proxy server 16. As discussed above, institutional server 18, in some arrangements, can receive standard user input 61 and secondary user input 63 and run the validation procedure.

Figure 2:
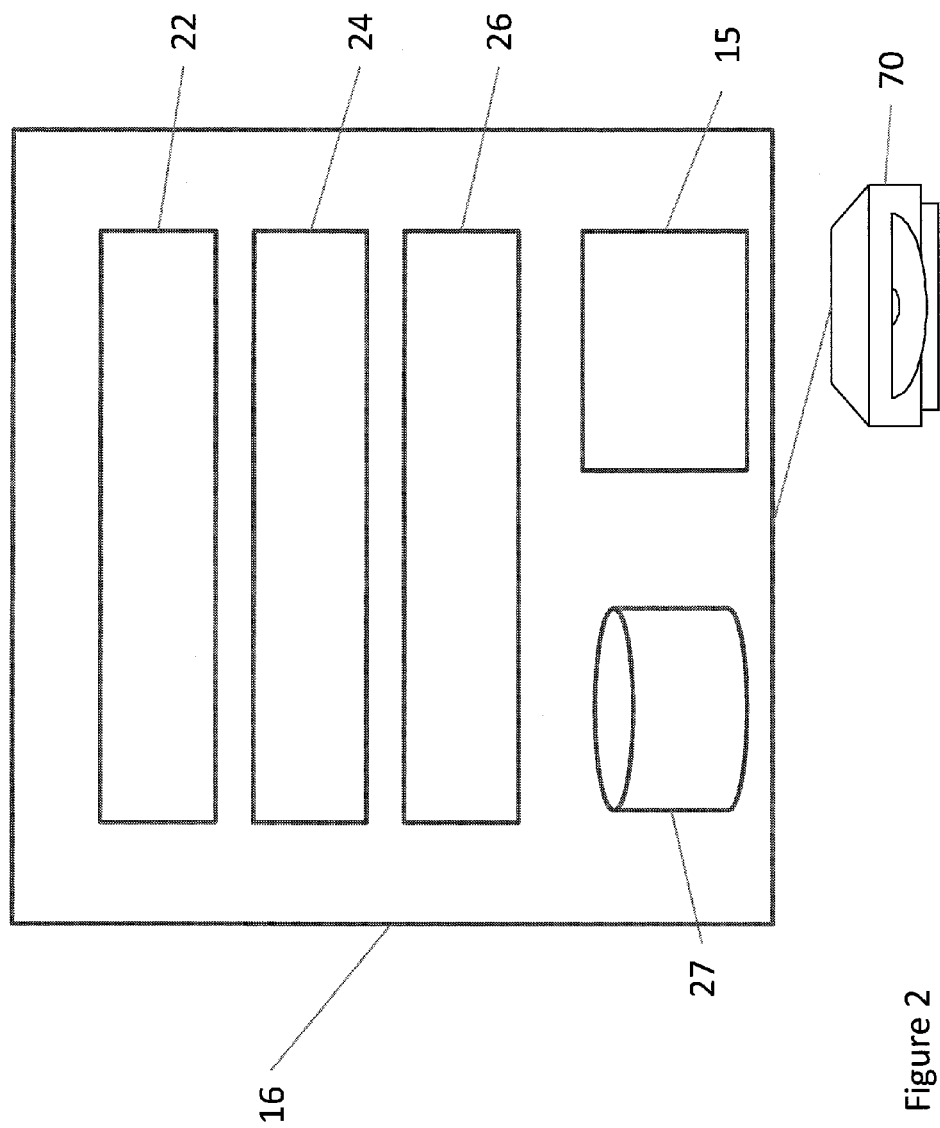
FIG. 2 is a block diagram showing particular details of a server with then electronic environment of FIG. 1, the server configured to perform a validation operation on a set of standard user input and a set of secondary user input.

FIG. 2 shows further detail of the proxy server 16. Proxy server 16 includes a processor 22, memory 24 and network interface 26. In some arrangements, proxy server 16 includes a storage medium 27 and cache 15 with which to store secondary user input 63 sent via streaming from client computer 14.

Memory 24 is configured to store a computer program which is constructed and arranged to run a validation operation on received standard user input and input peripheral device data.

Processor 22 can take the form of, but is not limited to, an Intel or AMD-based MPU, and can be a single or multi-core running single or multiple threads. Processor 22 is coupled to memory 24 and is configured to execute the computer program stored in memory 24.

Network interface 26 is configured to receive standard user input 61 and secondary user input 63 from client computer 14 and send messages 67 containing results of running the validation operation to institutional server 18.

Storage medium 27 stores received standard user input and files containing input peripheral device data. The computer program can be run from a set of compiled libraries stored within storage medium 27.

During operation, proxy server 16 separately receives standard user input 61 and secondary user input 63 via network interface 26. As stated previously, secondary user input 63 can be sent from client computer 14 as a file containing secondary user input 63 stored between the time the banking application was launched in browser 23 through to the time the user at client computer 14 sent the standard user input 61.

Once the proxy server 16 receives the standard user input 61 and secondary user input 63, processor 22 retrieves code from memory 24 containing instructions to run a validation procedure on standard user input 61 and secondary user input 63. Once processor 22 runs the validation procedure on the standard user input 61 and secondary user input 63, processor 22 then assigns an authorization code to the transaction which is based on the standard user input based on results from the validation procedure.

In the following description, it will be understood that client computer 14 sends secondary user input 63, as well as standard user input 61, to network interface 26 as a document, or form. In other arrangements, as described above, client computer 14 sends secondary user input 63 as streaming data to be stored in cache 15.

Figure 3A:
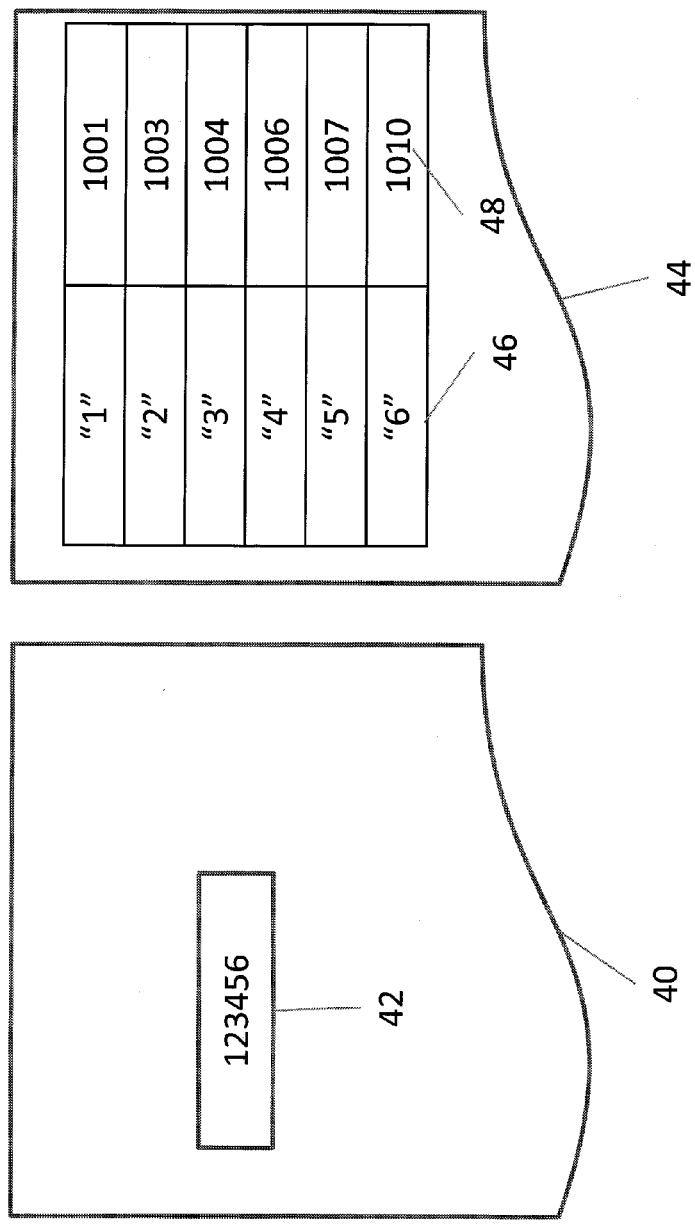
FIG. 3(a) is block diagram of a transaction datum and its corresponding set of secondary user input.

FIG. 3(a) illustrates a form [or document] 40 containing a text box with a field 42 representing, say, an account number 123456. In a conventional transaction processing system, client computer 14 sends form 40 containing field 42 as standard user input 61 to institutional server 18 which processes standard user input 61.

In the improved system, however, client computer 14 sends form 40 representing standard user input 61 to proxy server 16. In addition, client computer 14 sends a form 44 representing secondary user input 63 to proxy server 16. Form 44 includes a table with entries 46 and 48. Entries 46 represent each keystroke typed from input peripheral device 17. Although each digit in the account number 123456 is represented as a digit within quotes, e.g., "1", other representations are possible, for example ASCII representation. Entries 48 represent a timestamp for each keystroke, that is, the time as recorded within client computer 14 when the keystroke is recorded.

During operation, proxy server 16 separately receives forms 40 and 44 via network interface 26. As stated previously, form 44 can be sent from client computer 14 as a file containing secondary user input 63 stored between the time the banking application was launched in browser 23 through to the time the user at client computer 14 sent the standard user input 61.

Once proxy server 16 receives the standard user input 61 and secondary user input 63 via forms 40 and 44, respectively, processor 22 retrieves code from memory 24 containing instructions to run a validation procedure on the standard user input 61 and secondary user input 63. The validation procedure is configured, for example, to convert the secondary user input into string data of the same form as that supplied in the transaction data. In the case of the situation represented in FIG. 3(a), the validation procedure concatenates each keystroke together to create the string "123456". The validation operation may further use the timestamp data to judge the feasibility of a human user typing the individual keystrokes in the string "123456" at each timestamp as specified in the input peripheral device data.

Once processor 22 runs the validation procedure on the standard user input 61 and secondary user input 63, processor 22 then assigns an authorization code to the transaction which is based on the standard user input based on results from the validation procedure. For example, if the validation procedure concludes that the secondary user input 63 matches the standard and that a human user which created secondary user input 63 in form 44 indeed typed the string "123456" contained in the transaction data, then the authorization code would take the form of an acceptance 67 of the transaction. The acceptance 67 gets relayed to institutional server 18 over network interface 26 and institutional server 18 processes the transaction.

It should be understood that there is no unique method by which a given string in standard user input 61 can be generated from secondary user input 63. For example, human users are prone to errors and will make efforts to fix errors before sending transactional data. It should be further understood that modern browsers are equipped to run an Autofill function for users filling in forms in web pages within the browsers. An Autofill function is a name for a function which recognizes from, for example, a user history, a pattern in a name or an account number and allows the user to click on a final string rather than type in the full string.

Figure 3B:
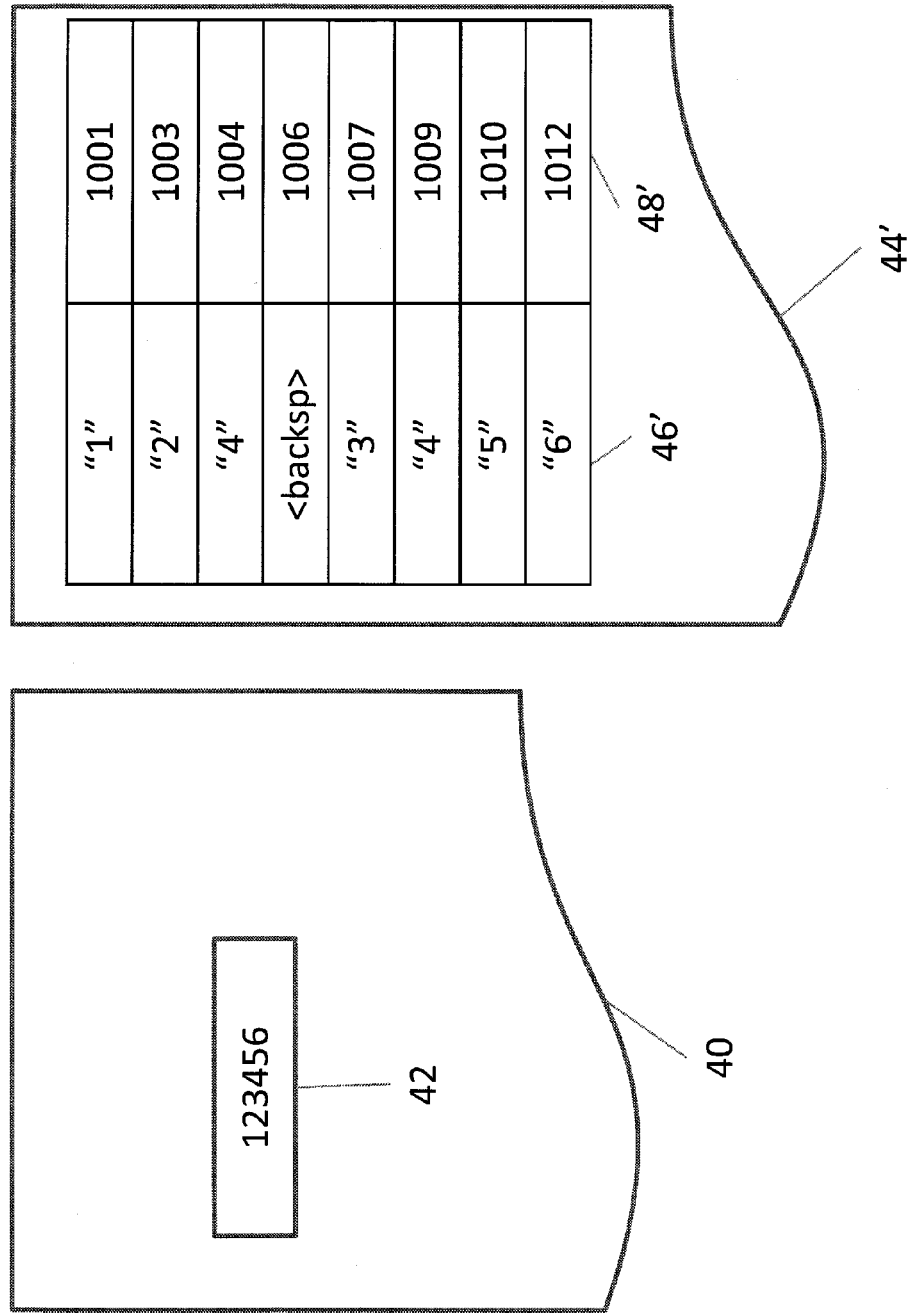
FIG. 3(b) is block diagram of another transaction datum and its corresponding set of secondary user input.

FIG. 3(b) shows a case where the user meant to type "123456", but typed a "4" instead of a "3" and immediately fixed the mistake. This situation is represented in form 44' with fields 46' and 48' representing keystrokes and timestamps, respectively. Note that the all keystrokes have been retained including the backspace used to erase the mistaken "4" character. The backspace also has its own timestamp and the validation procedure will take this data into account when determining if a human typing the sequence of keystrokes in field 46' with timestamps 48' could produce the string 42 in the standard user input 61.

Figure 3C:
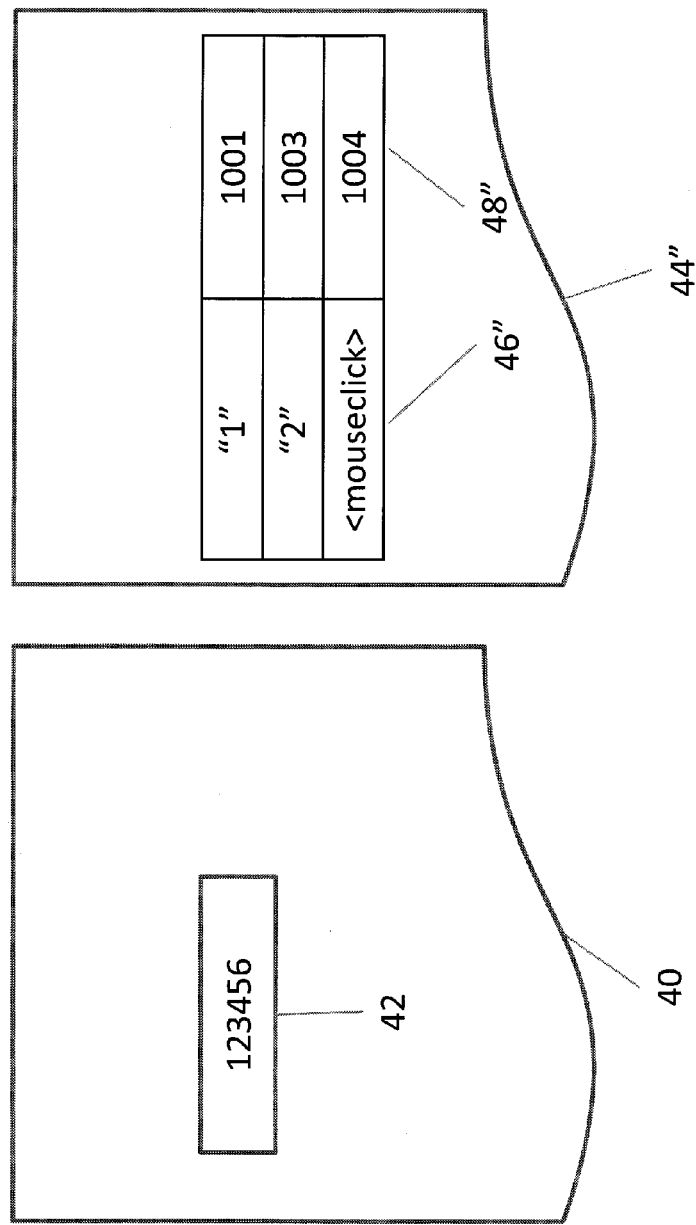
FIG. 3(c) is a block diagram of a further transaction datum and its corresponding set of secondary user input.

FIG. 3(c) shows a case in which the user elected to allow the browser to perform an Autofill function within the banking application. In this case, the fields 46" and 48" within form 44" show that the user typed in the first two characters of the string "123456" before clicking on the result offered by the Autofill function which presumably completed the string. In this case, it is not clear to the validation operation that the standard user input 61 "123456" could have been typed by a human which generated the secondary user input 63 in form 44". In such cases, the authorization codes can be defined to allow some flexibility to recognize the Autofill function. For example, instead of simply accepting or rejecting a transaction based upon the forms 40 and 44", the validation procedure can return an authorization code stating that the transaction be accepted with a flag. In this case, the transaction is accepted while the details of the transaction are stored in a watch database. Alternatively, the validation procedure can return an authorization code stating that the transaction be accepted pending additional information from the user. In this case, message 69 is sent to the user asking, for example, challenge questions for which the user has registered answers with the banking institution.

Another complication can occur when the user types data into a different window than the window which represents the banking application within browser 23. In this case, the validation procedure should differentiate secondary user input 63 corresponding to a form focus event, i.e., when secondary user input 63 occurs when the window containing the banking application is active, from secondary user input 63 corresponding to a different application represented in a separate window.

Figure 4A:
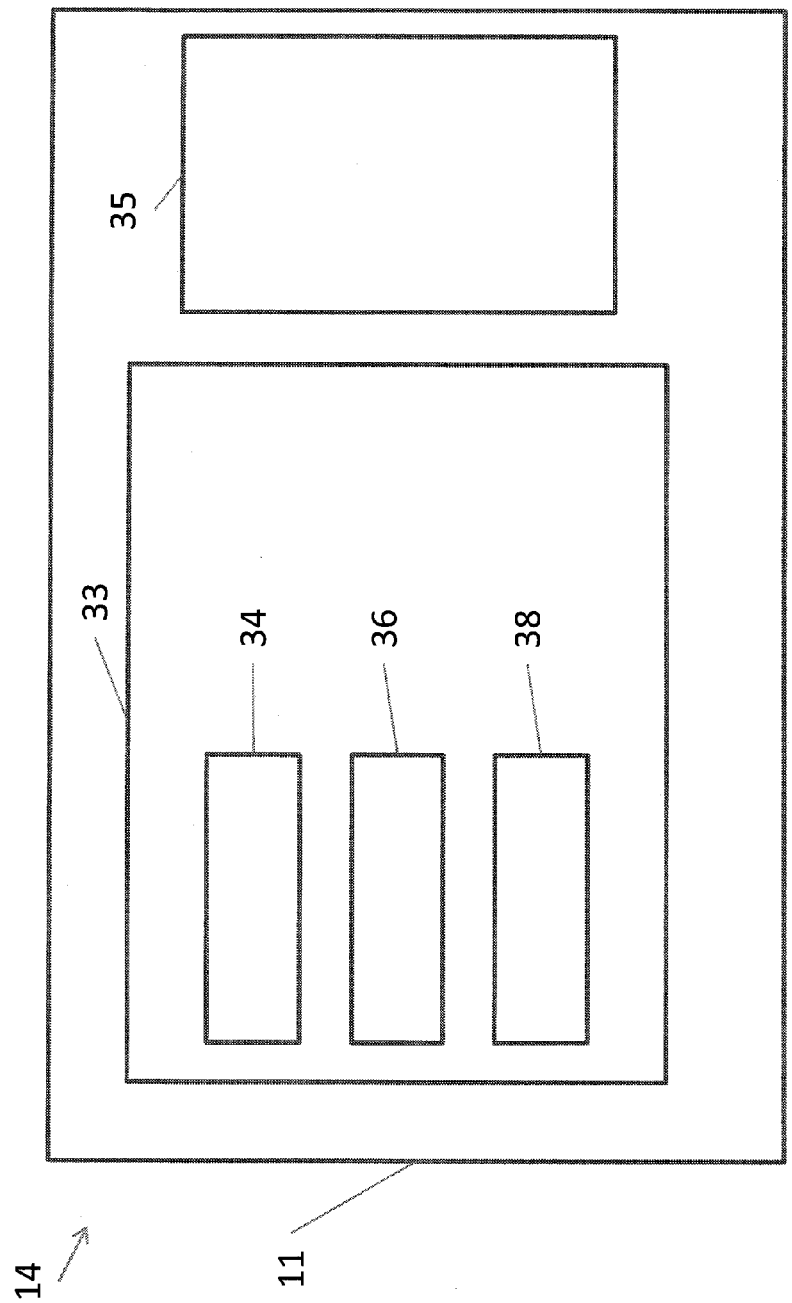
FIG. 4(a) is a block diagram of a user interface for a client computer in the electronic environment of FIG. 1 on which the set of standard user input and the set of secondary user input are generated.

FIG. 4(a) shows monitor 11 on client computer 14. Within monitor 11 two windows 33 and 35 are displayed. In FIG. 4(a), window 33 contains the browser within which a banking application runs. When the input from the input peripheral device 17 appears in the text boxes 34, 36, or 38 within window 33, window 33 is the active window. If another window, say window 35, which is not running the user interface to the banking application is active, secondary user input 63 from input peripheral device 17 will not be entered into text boxes 34, 36, or 38.

When the active window displayed on monitor 11 is the window 33 containing the banking application, or when a user switches windows on monitor 11 in general, a form focus event is generated. In a preferred embodiment, a form focus event is also sent, along with a timestamp, to proxy server 16.

Figure 4B:
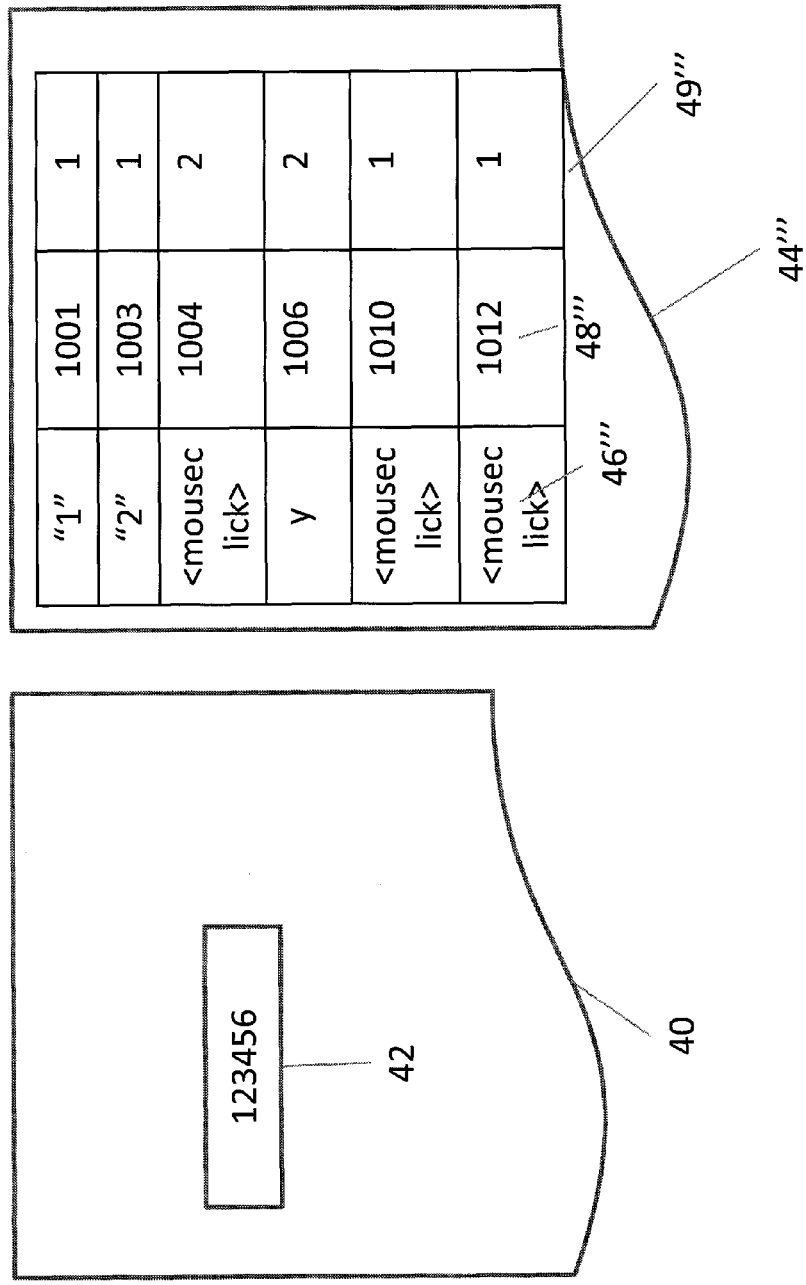
FIG. 4(b) is a block diagram of a further transaction datum and its corresponding set of secondary user input.

FIG. 4(b) shows one way in which form focus data can be incorporated into secondary user input 63. Here, field 49''' corresponds to an active window within a user interface on client computer 14. In this case, the fields 46''', 48''' and 49''' within form 44''' show that the user typed in the first two characters of the string "123456" within window "1" before clicking on a different window, "2". The user types a character into window "2" and then clicks on window "1" to make window "1" the active window again. The user then provides another mouse click to provide an Autofill function to fill in the account number. In this example, all secondary user input 63 associated with window "2" is ignored by the validation operation.

Figure 5:
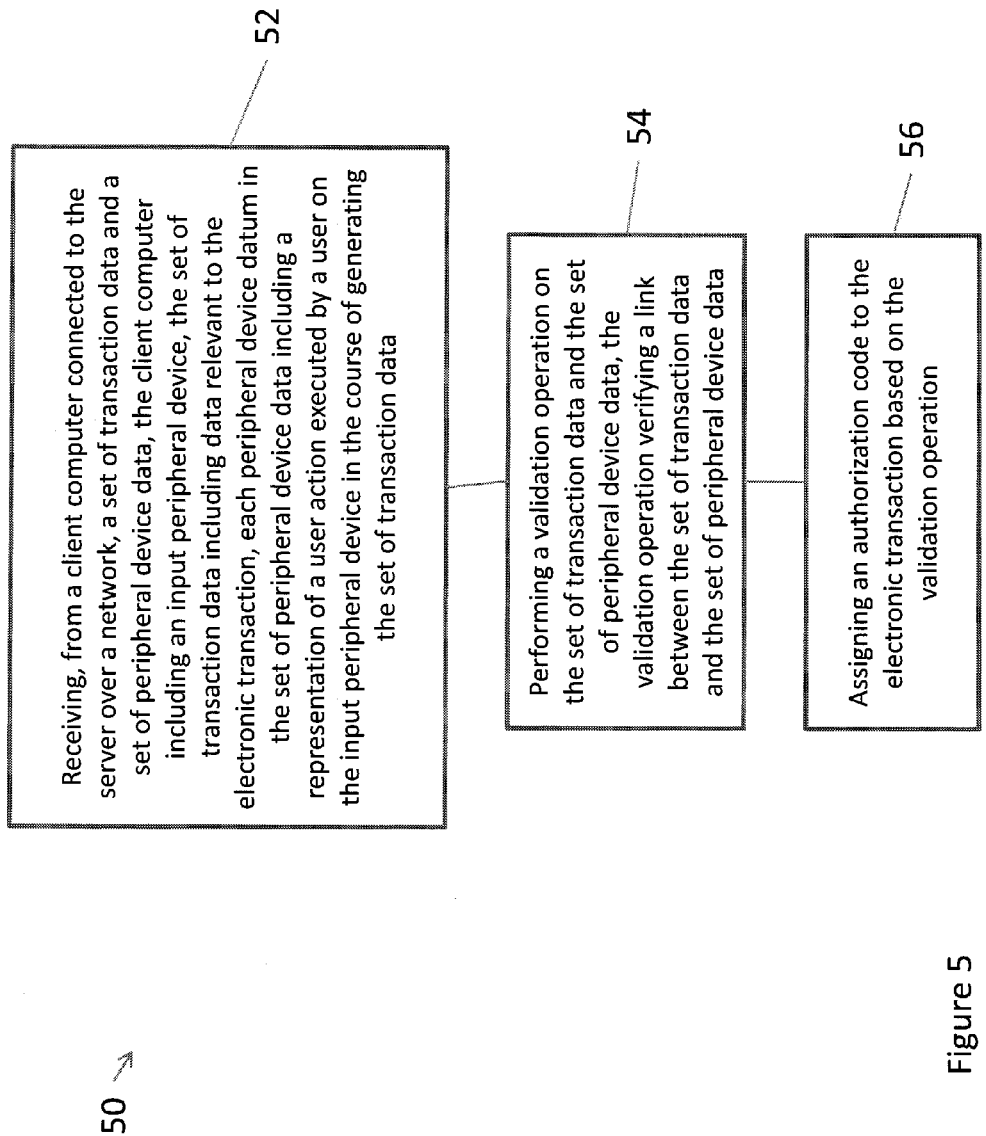
FIG. 5 is a flowchart of a method performed by a system within the electronic environment of FIG. 1.

FIG. 5 shows a method 50 of processing an electronic transaction. In step 52 a set of standard user input and a set of peripheral device data is received from a client computer connected to a server over a network, the client computer including an input peripheral device, the set of standard user input including data relevant to the electronic transaction, each peripheral device datum in the set of peripheral device data including a representation of a user action executed by a user on the input peripheral device in the course of generating the set of transaction data. In step 54, a validation operation is performed on the set of standard user input and the set of peripheral device data, the validation operation verifying a link between the set of standard user input and the set of peripheral device data. In step 56, an authorization code is assigned to the electronic transaction based on the validation operation.

In step 52, the peripheral device data can include keyboard strokes, mouse clicks and mouse coordinate data and voice signals. The peripheral device data is sent separately from the standard user input over a communication medium. For example, the peripheral device data can be streamed in real time over the communication medium. In another example, the secondary user input can be stored in a local file on a client computer and then sent over the communication medium when the standard user input is sent. The peripheral device data further includes a timestamp corresponding to each event (i.e., keystroke, mouse click, etc.).

In step 54, the validation operation can include processing the peripheral device data to see if a simulated client computer would produce the same set of standard user input sent with the peripheral device data.

In step 56, the authorization code can include a code corresponding to the statuses of being approved unconditionally, transaction being approved with a flag, transaction being conditionally approved pending further information received from the at least one client computer, and transaction being not approved.

While various embodiments of the invention have been particularly shown and described, it will be understood by those skilled in the art that various changes in form and details may be made therein without departing from the spirit and scope of the invention as defined by the appended claims.

For example, it should be understood that some embodiments are directed to an electronic environment which utilizes server 16 which processes an electronic transaction. Some embodiments are directed to server 16. Some embodiments are directed to a method of processing, on a computer having a processor, an electronic transaction. Also, some embodiments are directed to a computer program product which enables computer logic to perform the processing of an electronic transaction on a computer having a processor.

In some arrangements, server 16 is implemented by a set of processors or other types of control/processing circuitry running software. In such arrangements, the software instructions can be delivered to server 16 in the form of a computer program product (illustrated generally by a diskette icon 70 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method of processing an electronic transaction, the method comprising:
   receiving, by a server and from a client computer connected to the server over a network, user input and peripheral device data, the client computer including an input peripheral device, the user input including electronic transaction data, the peripheral device data including a representation of a user action executed by a user on the input peripheral device in the course of generating the electronic transaction data;
   performing, by the server, a validation operation on the user input and the peripheral device data, the validation operation verifying a link between the user input and the peripheral device data; and
   assigning, by the server, an authorization code to the electronic transaction based on the validation operation;
   wherein the peripheral device data includes a set of keystrokes and a corresponding timestamp for each keystroke in the set of keystrokes, the timestamp denoting a time of execution of the corresponding keystroke;
   wherein performing the validation operation includes verifying that the set of keystrokes with each keystroke in the set of keystrokes executed at the time of execution denoted by the corresponding timestamp, produces the electronic transaction data;
   wherein assigning the authorization code includes assigning, to the electronic transaction, a designation from a group of designations which includes transaction approved unconditionally, transaction approved with a flag, transaction conditionally approved pending further information received from the at least one client computer, and transaction not approved;
   wherein the peripheral device data further includes a set of mouse clicks and a corresponding timestamp for each mouse click in the set of mouse clicks, the timestamp denoting a time of execution of the corresponding mouse click;
   wherein performing the validation operation further includes verifying that the set of mouse clicks, each mouse click executed at the time of execution denoted by the corresponding timestamp, in addition to the set of keystrokes, produces the electronic transaction data;
   wherein the peripheral device data further includes a form focus event, the form focus event denoting an identification of an active window on the client computer; and
   wherein performing the validation operation further includes verifying that the set of keystrokes and the set of mouse clicks includes only those keystrokes and mouse clicks with time stamps corresponding to a form focus event for a window whose identification is associated with the electronic transaction on the client computer.

2. A method as in claim 1, wherein assigning the authorization code further includes assigning the authorization code of transaction approved with a flag to the electronic transaction when a group of keystrokes from the set of keystrokes and corresponding timestamps for each keystroke in the group of keystrokes produce a prefix of an electronic transaction datum.

3. A method as in claim 1, wherein the server is a proxy server corresponding to an institutional server on which the electronic transaction is capable of being processed; and
wherein the method further comprises:
sending, by the proxy server and to the institutional server, the authorization code.

4. A method as in claim 3, wherein the client computer includes a set of user computers connected to the proxy server, the number of user computers in the set of user computers being substantially greater than one;
wherein the proxy server includes a set of compiled libraries; and
wherein performing the validation operation includes running, on the proxy server, an executable file defined by the compiled libraries, the executable file constructed and arranged to verify, on each client computer, that each mouse click and keystroke from the set of keystrokes and the set of mouse clicks, executed at the time of execution denoted by the corresponding timestamp, produces the set of transaction data.

5. A method as in claim 3, wherein the institutional server hosts a banking application for a banking institution;
wherein an electronic transaction includes a transfer of funds from a first account in the banking institution to a second account in the banking institution;
wherein receiving the user input includes receiving a request to transfer the funds from the first account to the second account;
wherein performing the validation operation includes verifying that the set of event data considered as a set of keystrokes and mouse clicks during a form focus event produces the request to transfer the funds from the first account to the second account.

6. A method as in claim 1, wherein the server includes a cache;
wherein receiving the peripheral device data includes receiving a stream of keystrokes from the set of keystrokes, each streamed keystroke sent form the client computer to the server in real time, each streamed keystroke stored in the cache; and
wherein performing the validation operation includes obtaining the received keystrokes from the cache.

7. A method as in claim 1, wherein receiving the user input and the set of peripheral device data includes:
acquiring, as the user input, input which is manually entered by a user operating the input peripheral device, the input being pertinent to the electronic transaction, and
acquiring, as the set of peripheral device data, ancillary information which is generated by the client computer;
wherein performing the validation operation on the user input and the set of peripheral device data includes:
generating a consistency result based on an comparison between (i) the input which is manually entered by the user and (ii) the ancillary information which is generated by the client computer, the consistency result indicating whether the user input was genuinely manually entered by the user; and
wherein assigning the authentication code to the electronic transaction based on the validation operation includes:
providing, as the authentication code, a first command to authorize processing of the electronic transaction when the consistency result indicates that the user input was genuinely manually entered by the user and a second command to prevent processing of the electronic transaction when the consistency result indicates that the user input was not genuinely manually entered by the user.

8. A method as in claim 7, wherein the server is provisioned with a set of remedial policies; and wherein providing the second command when the consistency result indicates that the user input was not genuinely manually entered by the user includes providing the user with a new authentication challenge when the set of policies includes a challenge policy directing the user to be challenged when the consistency result indicates that the user input was not genuinely manually entered by the user.

9. An electronic apparatus for processing an electronic transaction, the apparatus comprising:
a network interface coupled to a network;
a memory; and
a processor coupled to the memory, the processor programmed to perform the operations of:
receiving, from a client computer connected to the apparatus over a network, a user input and a set of standard peripheral device data, the client computer including an input peripheral device, the user input including electronic transaction data, the peripheral device data including a representation of a user action executed by a user on the input peripheral device in the course of generating the electronic transaction data;
performing a validation operation on the user input and the peripheral device data, the validation operation verifying a link between the user input and the peripheral device data; and
assigning an authorization code to the electronic transaction based on the validation operation;
wherein the peripheral device data includes a set of keystrokes and a corresponding timestamp for each keystroke in the set of keystrokes, the timestamp denoting a time of execution of the corresponding keystroke;
wherein performing the validation operation includes verifying that the set of keystrokes with each keystroke in the set of keystrokes executed at the time of execution denoted by the corresponding timestamp, produces the electronic transaction data;
wherein assigning the authorization code includes assigning, to the electronic transaction, a designation from a group of designations which includes transaction approved unconditionally, transaction approved with a flag, transaction conditionally approved pending further information received from the at least one client computer, and transaction not approved;
wherein the peripheral device data further includes a set of mouse clicks and a corresponding timestamp for each mouse click in the set of mouse clicks, the timestamp denoting a time of execution of the corresponding mouse click;
wherein performing the validation operation further includes verifying that the set of mouse clicks, each mouse click executed at the time of execution denoted by the corresponding timestamp, in addition to the set of keystrokes, produces the data in the set of transaction data: wherein the peripheral device data further includes a form focus event, the form focus event denoting an identification of an active window on the client computer; and wherein performing the validation operation further includes verifying that the set of keystrokes and the set of mouse clicks includes only those keystrokes and mouse clicks with time stamps corresponding to a form focus event for a window whose identification is associated with the electronic transaction on the client computer.

10. An apparatus as in claim 9, wherein assigning the authorization code further includes assigning the authorization code of transaction approved with a flag to the electronic transaction when a group of keystrokes from the set of keystrokes and corresponding timestamps for each keystroke in the group of keystrokes produce a prefix of an electronic transaction datum.

11. An apparatus as in claim 9, further comprising a cache; wherein receiving the set of peripheral device data includes receiving a stream of keystrokes from the set of keystrokes, each streamed keystroke sent form the client computer to the server in real time, each streamed keystroke stored in the cache; and
wherein performing the validation operation includes obtaining the received keystrokes from the cache.

12. A computer program product having a non-transitory computer readable storage medium which stores a set of instructions to process an electronic transaction, the set of instructions, when carried out by a server, causing the server to perform a method of:
receiving, from a client computer connected to the server over a network, user input and peripheral device data, the client computer including an input peripheral device, the user input including electronic transaction data, the peripheral device data including a representation of a user action executed by a user on the input peripheral device in the course of generating the electronic transaction data;
performing a validation operation on the user input and the peripheral device data, the validation operation verifying a link between the user input and the set of peripheral device data; and
assigning an authorization code to the electronic transaction based on the validation operation;
wherein the peripheral device data includes a set of keystrokes and a corresponding timestamp for each keystroke in the set of keystrokes, the timestamp denoting a time of execution of the corresponding keystroke;
wherein performing the validation operation includes verifying that the set of keystrokes with each keystroke in the set of keystrokes executed at the time of execution denoted by the corresponding timestamp, produces the electronic transaction data;
wherein assigning the authorization code includes assigning, to the electronic transaction, a designation from a group of designations which includes transaction approved unconditionally, transaction approved with a flag, transaction conditionally approved pending further information received from the at least one client computer, and transaction not approved;
wherein the peripheral device data further includes a set of mouse clicks and a corresponding timestamp for each mouse click in the set of mouse clicks, the timestamp denoting a time of execution of the corresponding mouse click;
wherein performing the validation operation further includes verifying that the set of mouse clicks, each mouse click executed at the time of execution denoted by the corresponding timestamp, in addition to the set of keystrokes, produces the data in the set of transaction data:
wherein the peripheral device data further includes a form focus event, the form focus event denoting an identification of an active window on the client computer: and
wherein performing the validation operation further includes verifying that the set of keystrokes and the set of mouse clicks includes only those keystrokes and mouse clicks with time stamps corresponding to a form focus event for a window whose identification is associated with the electronic transaction on the client computer.

13. A computer program product as in claim 12, wherein assigning the authorization code further includes assigning the authorization code of transaction approved with a flag to the electronic transaction when a group of keystrokes from the set of keystrokes and corresponding timestamps for each keystroke in the group of keystrokes produce a prefix of an electronic transaction datum.

14. A computer program product as in claim 12, wherein the server includes a cache;
wherein receiving the set of peripheral device data includes receiving a stream of keystrokes from the set of keystrokes, each streamed keystroke sent form the client computer to the server in real time, each streamed keystroke stored in the cache; and
wherein performing the validation operation includes obtaining the received keystrokes from the cache.

\* \* \* \* \*